Jan. 22, 1946.  E. ORSHANSKY, JR  2,393,557
VEHICLE DRIVE CONTROL MECHANISM
Filed Oct. 3, 1941  5 Sheets-Sheet 1

INVENTOR.
Elias Orshansky, Jr.
BY Duell, Kane & Smoot
ATTORNEYS

Jan. 22, 1946.  E. ORSHANSKY, JR  2,393,557
VEHICLE DRIVE CONTROL MECHANISM
Filed Oct. 3, 1941  5 Sheets-Sheet 3

INVENTOR.
Elias Orshansky, Jr.
BY
Duell, Kane & Smoot
ATTORNEYS

Jan. 22, 1946. E. ORSHANSKY, JR 2,393,557
VEHICLE DRIVE CONTROL MECHANISM
Filed Oct. 3, 1941 5 Sheets-Sheet 4

INVENTOR.
*Elias Orshansky, Jr.*
BY *Duell, Kane & Smoot*
ATTORNEYS

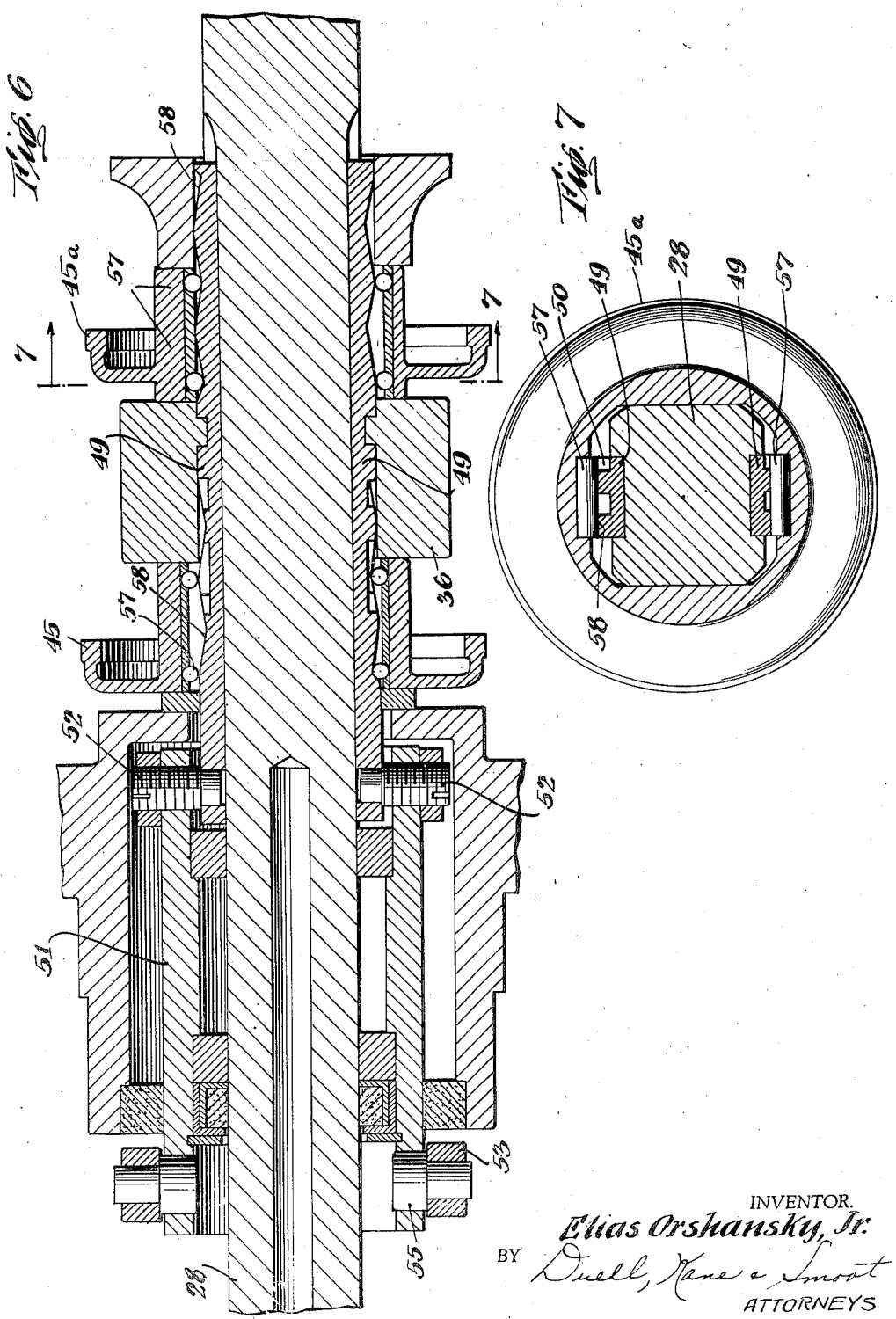

Patented Jan. 22, 1946

2,393,557

UNITED STATES PATENT OFFICE 2,393,557

VEHICLE DRIVE CONTROL MECHANISM

Elias Orshansky, Jr., Cleveland Heights, Ohio, assignor to The Aerotorque Company, Cleveland, Ohio, a corporation of Connecticut Application October 3, 1941, Serial No. 413,458

29 Claims. (Cl. 180—9.2)

This invention relates to a structurally and functionally improved control and, in its more specific aspects, aims to provide a mechanism of this nature which will be of particular utility when employed in connection with tractors, tanks and similar units and especially where treads, or vehicle supporting and driving elements of the so-called "caterpillar" type are employed.

In connection with vehicles utilizing treads of the endless type, it is well appreciated that considerable difficulty has been experienced in connection with controlling their direction of travel and in generally maneuvering them. This is because, in such vehicles, it has not been feasible to employ steering wheels or similar expedients involving a dirigible element to contact the surface being traversed and in order to control the direction of movements of the vehicle over such surface. While numerous expedients have been resorted to, it has been the usual practice to associate with the drive shafts, braking elements, controlling the different side treads or elements. As a consequence of these braking elements, or mechanisms, it is, of course, obvious that, even with a source of power common to both of the treads, it is feasible to retard the movements of one or the other of the drive shafts so as to correspondingly slow down the movements of the tread element operated by such shaft. Accordingly, the tread associated with the second drive shaft has traveled at a faster speed than the retarded tread. In fact, where differentials are furnished intermediate the two drive shafts and the main source of power, such slowing down or retarding of one drive shaft has resulted in a corresponding acceleration of rotation on the part of the other drive shaft.

In any event, under such functioning of the parts, the other tread has caused the vehicle to travel in a circle; the inner tread defining a path of movement which was also circular, but along an arc having less radius than the circular path traversed by the other tread. On releasing somewhat the braking or retarding effect on the first mentioned drive shaft, it has been feasible for the vehicle to traverse a path which, while still in the form of an arc, had a less acute radius than theretofore. Conversely, by releasing the braking effect on one drive shaft and retarding the movement of the second drive shaft to a greater or lesser extent, the vehicle has been caused to move in an opposite circular direction. With the braking provisions on both shafts inoperative, these shafts have tended to move at similar rates of speed and, therefore, the vehicle has, under these circumstances, followed a normally straight path.

It is, of course, appreciated by those skilled in the operation of vehicles of this type, that a great amount of useful power is dissipated in the form of heat generated by controlling the vehicle through retarding or braking the movement of one of its drive shafts. Moreover, no exact control can be effected in a vehicle having such an arrangement of mechanism. This is obvious because any conditions of resistance to movement encountered on the part of the different treads, will call for continually varying the braking effect on the drive shafts if the vehicle is to be held to a predetermined curved path. Such variations in resistance to movement may, of course, be found incident to obstructions encountered by the treads, a shifting of the center of gravity of the vehicle, the fact that the vehicle is ascending or descending a portion of terrain along an inclined path (which, of necessity, throws a major load on the "downhill" tread), or the fact that the different treads of the vehicle encounter different tractive conditions, such as would be represented by mud, snow, ice or similar factors.

Also, as a consequence of the unequal conditions of resistance to movement encountered by the treads, constant care has to be exercised by the operator and he must continuously manipulate the controls associated with the different shafts in order to cause the movement of the vehicle along a straight path.

With the foregoing difficulties in mind, it is an object of the invention to provide a control for vehicles of the type in question and by means of which the operator will be able to cause the vehicle to traverse a predetermined path and without the necessity of constantly resorting to manual manipulation of the control.

A further object is that of providing a mechanism of this character which, when incorporated in a vehicle, will cause the latter to maintain a given direction of travel irrespective of a shift in its center of gravity (due to the latter climbing up or descending an inclined surface) or due to the vehicle treads encountering irregularities and obstructions in the terrain which is being traversed.

Another object is that of furnishing a control by means of which the treads of the vehicle may be so locked with respect to each other, that their movements will either be synchronized or the movement of one tread will maintain a definite ratio of over- or under-drive with respect to the movement of the second tread of the vehicle.

An additional object is that of furnishing a mechanism of this type and by means of which the movements of one or the other drive shafts may be retarded without, however, dissipating power. In other words, by means of the present invention, the retarding action results in a regeneration of power which is transmitted from the retarded shaft to the relatively accelerated shaft.

Still another object is that of providing a mechanism of this type which may readily be installed in a vehicle of the class described without such installation in any way encumbering the interior of the vehicle; the mechanism of the present invention, moreover, including relatively few parts, each individually simple and rugged in construction and such parts operating over long periods of time with freedom from all difficulties.

With these and other objects in mind, reference is had to the attached drawings illustrating one practical embodiment of the invention, and in which:

Fig. 6 is an enlarged sectional side view taken along the lines 6—6 in the direction of the arrows as indicated in Fig. 2; and Fig. 7 is a transverse sectional view taken along the lines 7—7 in the direction of the arrows as indicated in Fig. 6.

Figure 1:
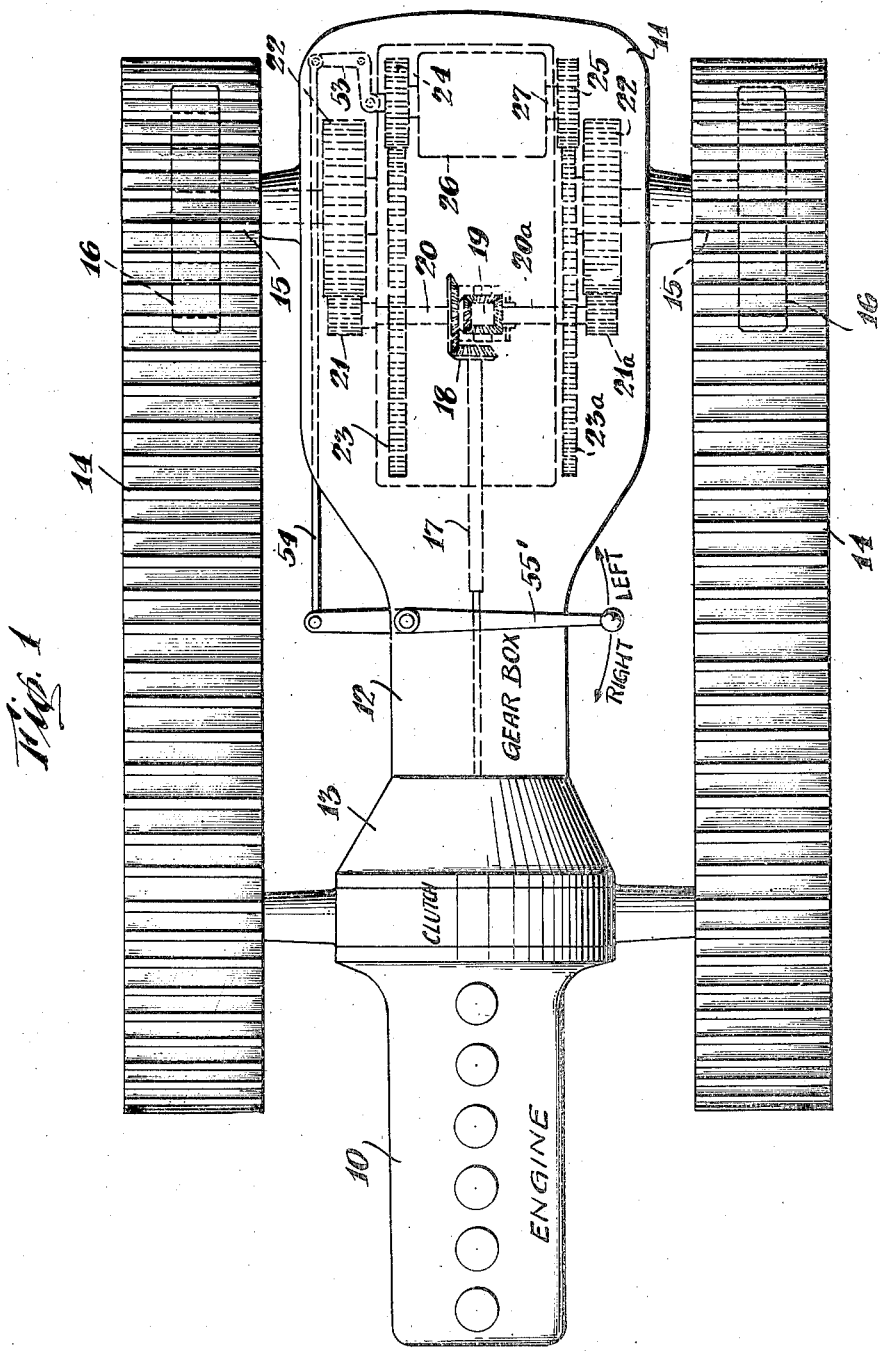
Fig. 1 is a plan view of a vehicle incorporating a drive constructed in accordance with the teachings of the present invention.

Referring primarily to Fig. 1, it will be seen that the reference numeral 10 indicates a motor and 11 a chassis. The chassis may support a gear box 12 and a clutch housing 13, both of which have been diagrammatically illustrated. Also, extending from the chassis, may be any suitable number of supporting wheels (not shown) by means of which the tread elements 14 may be mounted and guided. These tread elements may conveniently include a number of separate members pivotally coupled together to, in aggregate, provide flexible endless elements. They may, of course, also incorporate any desirable or alternative structure. In any event, they provide stable, supporting and ground-contacting members for the vehicle and which, when moved, will correspondingly move the vehicle.

In order to effect such movement, there extends from the chassis 11 a pair of drive shafts 15 which may, conveniently support adjacent their outer ends sprockets 16. The latter are usually formed with or mount a series of teeth to engage with corresponding teeth forming a part, or associated with the tread elements 14. Accordingly, with the sprockets 16 rotating, the treads will be moved along endless paths.

To secure movement of these shafts, the motor, of course, serves to rotate the clutch which may be disposed within the housing 13. According to the disposition and meshing of the gears within the box 12, the drive shaft 17 of the vehicle is rotated in clockwise or counter-clockwise directions and—with constant R. P. M. of the motor 10—at varying rates of speed. Accordingly, the pinion 18, affixed to shaft 17 is driven and serves to drive the differential assembly 19. This results in a rotation of drive shafts 20, 20a extending from the differential assembly.

As will be understood, the arrangement of mechanism described in general terms up to the present point of the specification, is more or less optional. The parts within the housing 12 and 13 may follow any desired form of construction or in certain instances may be modified or eliminated. Likewise, while in Fig. 1 a vehicle of the tractor type has been primarily shown, it will be appreciated that another type of vehicle might be involved. For example, in the case of a tank, the engine, instead of being located in the forward end of the vehicle, could be located in the rear of the same and the sprockets 16, instead of being disposed toward the rear of the vehicle, would be usually mounted adjacent the forward end of the same. These and various other alternative forms of construction have not been illustrated in order to avoid unnecessary sheets of drawings and prolixity of the specification which would, in effect, contribute nothing to an understanding of the invention. These changes and modifications, which would otherwise be illustrated and described will be perfectly obvious to anyone skilled in the art.

Figure 2:
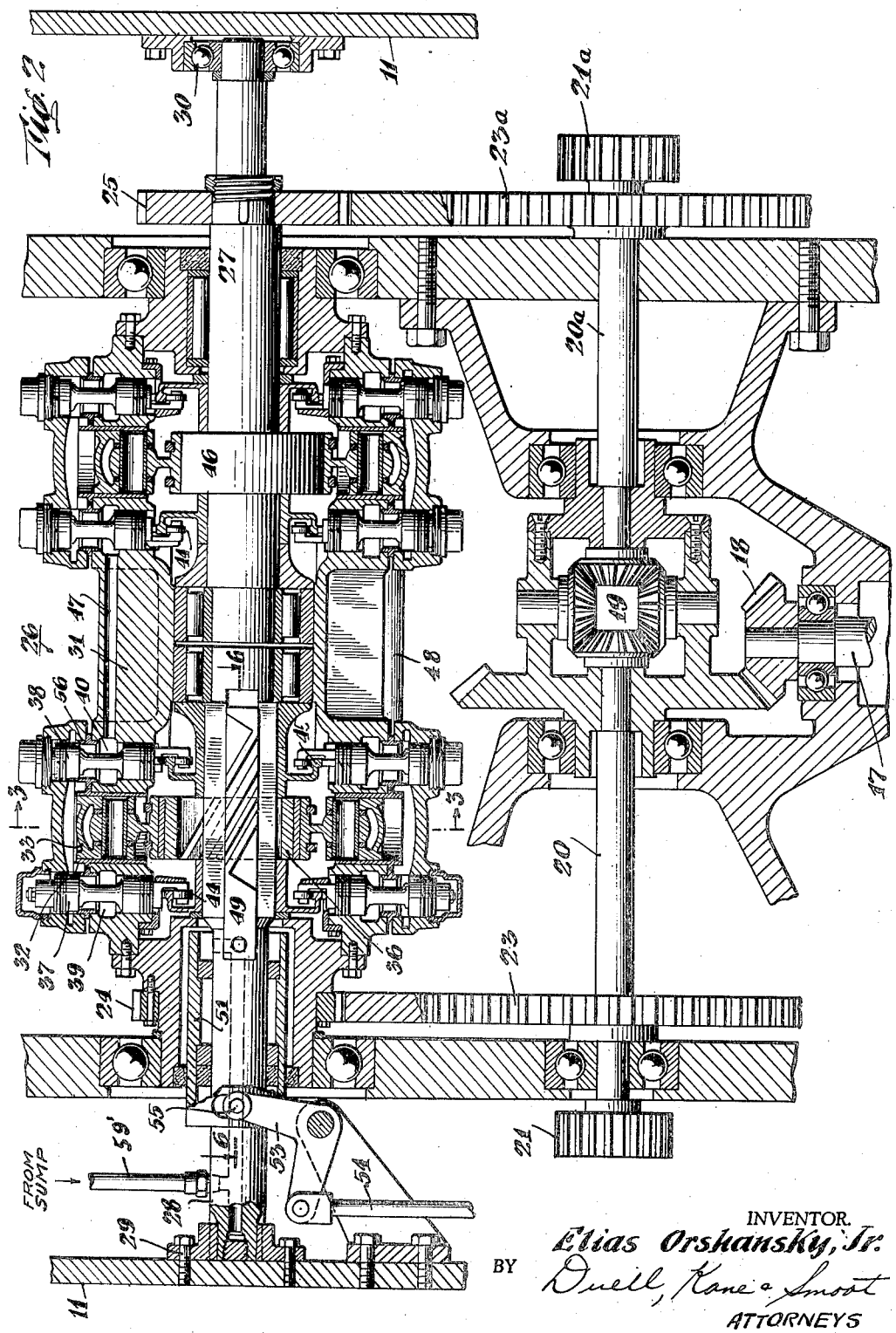
Fig. 2 is a sectional plan view of the main portion of the drive as illustrated in Fig. 1.

With the foregoing in mind, reference is now had to Fig. 2 of the drawings, which should be considered in conjunction with Fig. 1. In this view, the reference numerals 21, 21a indicate the pinions which are attached to shafts 20, 20a, respectively, and mesh with gears 22 affixed to shafts 15 in order to rotate the latter and the sprockets 16. As illustrated, shafts 20, 20a also mount gears 23, 23a, respectively, and the teeth of the latter respectively mesh with gears 24 and 25. Gear 24 is fixed with respect to, or forms a part of the housing of a control and drive unit generally indicated at 26. Gear 25 is secured to one of the shafts 27 of such unit. The other shaft 28, extending from the unit 26, may be affixed to the chassis 11 in any desirable manner as, for example, by bolts 29. As will also be observed, shaft 27 is conveniently supported upon anti-friction bearings 30, mounted by the chassis, and the inner end of the shafts 27 and 28 may be similarly supported, shaft 27 being rotatable with respect to stationary shaft 28.

Figure 3:
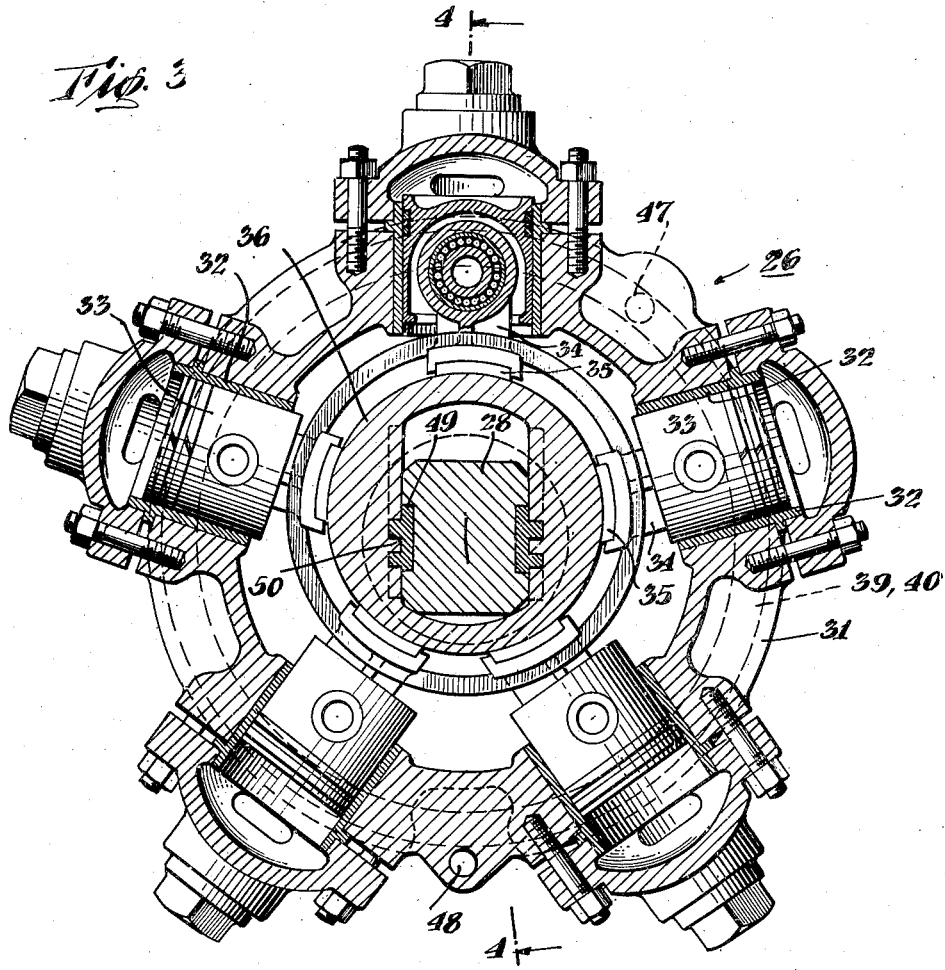
Fig. 3 is an enlarged transverse sectional view taken along the lines 3—3 in the direction of the arrows as indicated in Fig. 2.
Figure 5:
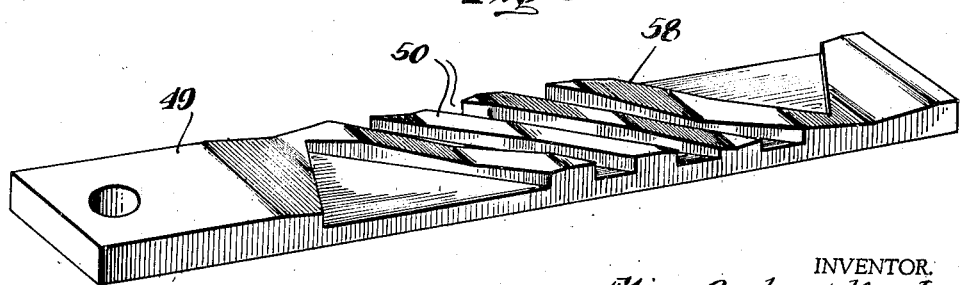
Fig. 5 is a perspective view of one of the control elements forming a part of the structure especially shown in Figs. 3 and 4.

The unit, generally indicated at 26, comprises a housing 31, providing a common enclosure for parts of two positive hydraulic displacement units. One of these, under certain conditions, will function as a pump and the other will operate as a hydraulic motor. Conversely, under certain operating conditions, the unit which has heretofore operated as a pump may function as a motor and that which has been functioning as a motor may operate as a pump. In certain instances, both units will in effect be inoperative. As shown especially in Fig. 2, the left hand unit has variable capacity and the right hand unit is of fixed stroke, or capacity. Considering the left hand unit, it will be observed that in the form shown (see Fig. 3) it includes a plurality of radially extending cylinders 32, within which pistons 33 reciprocate. Such pistons are caused to have the desired movement by associating with the same, connecting rods 34. These connecting rods may carry bearing elements 35, having contact with an eccentric 36 supported, in a manner hereinafter brought out, by shaft 28. Valves 37 and 38 are associated with each of the cylinders and preferably disposed on opposite sides thereof. These valves control the flow into and from annular passages 39 and 40. As illustrated, the valves are arranged in two different series, each of which corresponds in number to the number of cylinders which are provided. The passages 39 or 40 are preferably common to all of the valves of a given series.

Figure 4:
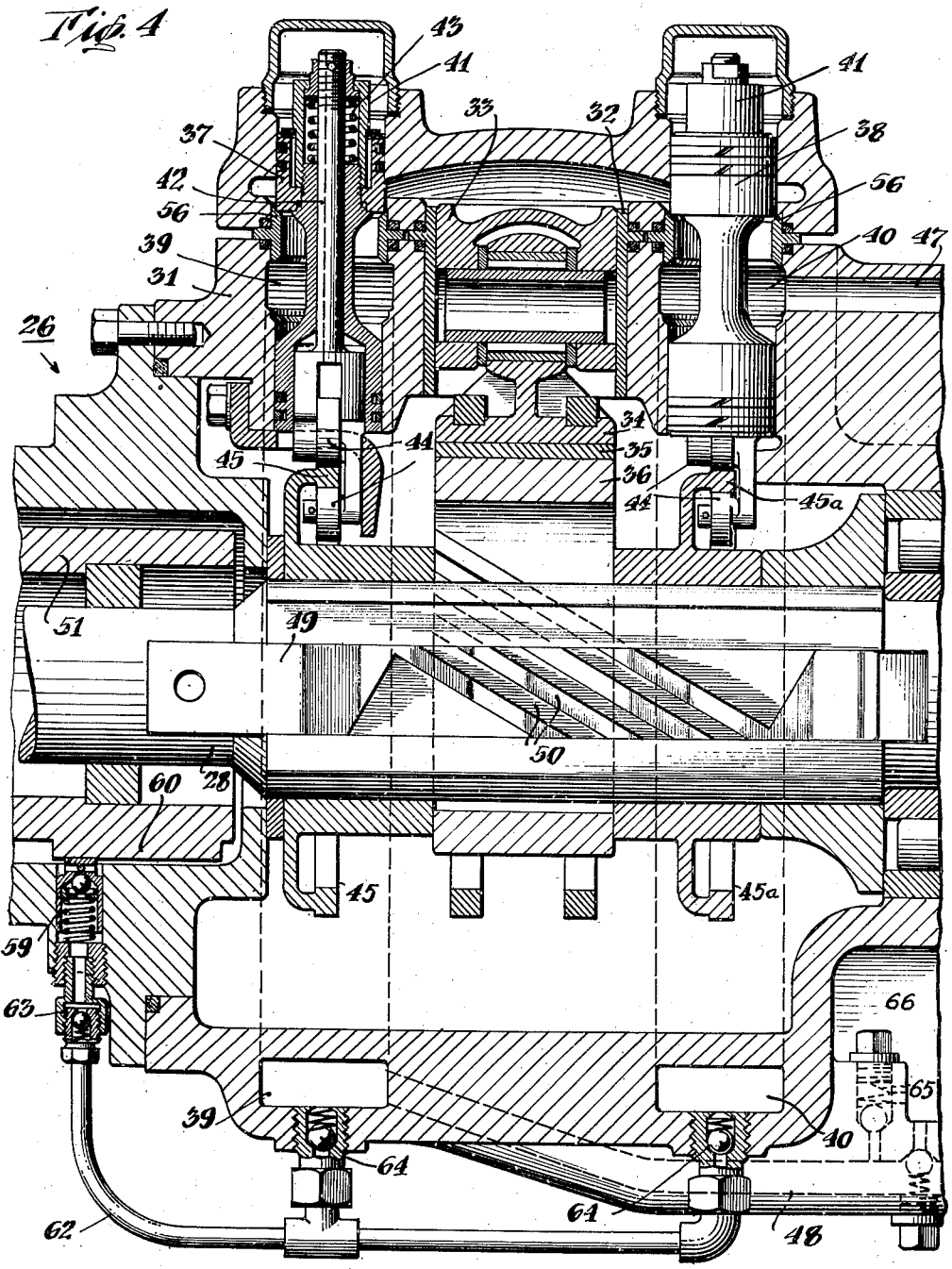
Fig. 4 is an enlarged sectional view taken along the lines 4—4 in the direction of the arrows as indicated in Fig. 3.

The valves may follow any desired construction, which, in effect, provides a leak-proof seal. While several types of valves achieve this result and may be used with entire satisfaction as part of the present control, I refer to one type as being ordinarily satisfactory. This is a valve which provides a "line-seal." In other words, in effect, a knife edge is presented which, in cooperation with a seat, virtually precludes the flow of any fluid unless this is desired by the operator and regardless of the amount of pressure of such fluid which is acting against the valve. Thus, as shown especially in Fig. 4, the valve conveniently includes a reciprocable body 41 connected to an actuating rod or stem 42 by means of an interposed spring 43. The value of this spring is not very high in that the valve is of the "balanced" type and accordingly only minor energy will have to be expended to assure unseating of the valve. The spring 43, however, serves to urge the valve towards seated position and also furnishes what might be termed an adapter structure which will allow the valve to assume seated position and will nevertheless permit a continued limited movement on the part of the rod or stem 42. As is obvious, by having a balanced type of valve, fluid is free to act upon opposite surfaces of the same. Consequently, only minimum effort will be necessary to effect an unseating of the valve instead of having to shift the latter against a head of high pressure fluid which would, of course, require expenditure of considerable effort.

To secure an actuation of the stem 42, it is preferred that rollers 44 be mounted by the inner end of the stem. These rollers engage eccentrics 45, 45a supported by shaft 28 and accordingly, as the assembly providing the cylinders is rotated with respect to the stationary shaft 28, the valve will be shifted from seated to unseated positions. This operation of the valve will, of course, occur in properly timed sequence with reference to the reciprocation of the pistons, so that fluid will either move into the cylinders to drive the pistons or else the latter will shift to expel fluid from the cylinders.

The right hand unit, as shown in Fig. 2, follows preferably the precise construction just described in connection with the left hand unit in that figure. This is excepting only the fact that eccentric 46 of the right hand unit, which serves to reciprocate the pistons or to be rotated by the latter, is fixed with respect to shaft 27; the same being true of the valve-operating eccentrics. The particular construction employed to mount the eccentric 36 with reference to the shaft 28 will hereinafter be described. Likewise, in the right hand unit, passages corresponding to 39 and 40 are provided and these passages connect to transversely extending passages 47 and 48 as particularly shown in Figs. 2 and 3. It will also be noted that passages 47 extend between the inner annular ducts or chambers 40, while the passages 48 extend between the outer corresponding ducts or passages 39.

Now considering the particular structure which may be employed to couple the eccentric 36 to the shaft 28, attention is directed to Figs. 3 to 7 inclusive. In these views, it will be noted that the shaft, at preferably diametrically opposite points, has grooves built or otherwise formed in its face. Inset within these grooves, are blocks or slide elements 49. It will also be observed that in line with the eccentric 36, the shaft may conveniently be substantially square in cross section and that the grooves are formed in the side faces of the shaft. Formed in the exterior faces of the slide elements 49 are a series of ribs and grooves 50 which extend at an angle to the direction of movement of the slide elements. The opening, through the eccentric 36, is sufficiently large to permit of this eccentric being shifted from a position at which it is concentric with respect to the axis of the shaft and to positions to either side of such first position and in which latter positions a maximum degree of throw or piston stroke results. In order to couple the slide elements 49 with the eccentric 36, the side faces of the opening or bore of the latter are grooved to receive the ribs 50. The ends of these slide elements are coupled, for example, to a sleeve 51 which is slidably mounted with respect to the shaft 28. Such coupling may be effected by pins 52. Conveniently, the other end of sleeve 51 is coupled to a control such as a bell crank lever 53 to which a rod 54 may be secured. As is shown especially in Fig. 2, such coupling of the lever may be effected by a pin and slot connection 55.

In any event, as the control lever or rod 54 is shifted, the sleeve 51 will be correspondingly moved to shift slide elements 49 longitudinally of shaft 28. As such shifting occurs, the eccentricity of element 36 will increase and decrease to either side of the axis of shaft 28, or this element will become substantially concentric with respect to such shaft. Therefore, according to the position occupied by the eccentric 36, the displacement of the various cylinders will be increased or diminished and such diminution may occur to a point where no reciprocation of the pistons within these cylinders occurs. The eccentric being susceptible to being shifted to either side of the axis of shaft 28, it, of course, follows that the action of the pistons when reciprocating may be reversed.

In other words, where a piston would heretofore have been moving inwardly, it will now be moving outwardly. To effectively control rod 54, a handle 55' may be employed and which latter, according to the teachings of the present invention, may be in the nature of a steering control. However, only a simple form of lever has been shown.

Mounted for movement with the element 36 are the eccentrics 45 and 45a which actuate the valve stems. It is to be understood, of course, that the degree of eccentricity capable of being assumed by the eccentrics 45 and 45a is very much less than that of the element 36. This will be because the valves 37, 38 may—even under maximum opening—travel only a fraction of the distance of the pistons. In other words, with the pistons moving, for example, through a three-inch stroke, the valves 37 and 38 need only move a fraction of an inch off their seats 56. Such an amount of unseating will be adequate, having in mind the velocity of fluid flow.

The structure whereby these desired results are achieved is probably best shown in Figs. 6 and 7 in which it will be apparent that the right hand eccentric 45a is mounted upon anti-friction elements such as rollers 57 which in turn traverse surfaces 58 of the slide elements 49 as the latter are shifted longitudinally of the axis of shaft 28. Such traversal results in a transverse shifting of the right hand eccentric 45a with respect to the shaft. Likewise, it will be observed that the left hand eccentric 45 is mounted in a manner, such that as the slide elements are shifted, a desired transverse shifting of this eccentric also occurs viz., in a direction opposite to that of eccentric 45a. It therefore follows that as the control rod 54 or its equivalent is operated, the eccentric elements or cranks 36 may be brought to any desired position. Simultaneously and by means of the mounting of the eccentrics 45 and 45a, the valves will be caused to operate a proportionate extent. Of course, such shifting of the eccentrics will at all times occur in a manner calculated to assure a proper operation of the valves. In this connection, it will be understood that whereas the eccentrics or cranks connected to the pistons of the hydraulic unit may be adjusted from an extreme position to one side of the shaft through to a position concentric with respect to the axis of the shaft and then through to an extreme position on the opposite side of the shaft the valve eccentrics travel merely from one side to the center and then in return movement from a substantially ineffective position back to the initial position.

With an apparatus installed in the manner aforedescribed, it is to be understood that the first thing which must be done is to be certain that the drive and control unit 26 has all of its cylinders and passages filled with liquid such as a suitable grade of oil or similar fluid. Care should be exercised to be certain that no air pockets come into being within the unit. To this end, an auxiliary pump 59 having suction conduit 59' (Fig. 2) connected to the sump (not shown) may be operated by a cam portion 60 of the sleeve 51. Connected to the outlet side of the pump 59 is a line 62, and a check valve 63 may be interposed between the pump and this line. Branches of the line connect by means of check valve assemblies 64 with the manifolds or passages 39 and 40. It will be understood, as a consequence of the foregoing structure, that oil will at all times be drawn from the central portion or sump of the unit and be pumped towards the manifolds 39 and 40. Consequently, the entire operative system of the unit will remain charged, and a relief structure is furnished, as by a relief valve 65 interposed between passage 48 and the sump 66, so that if a predetermined and maximum safe pressure is exceeded in the passages extending from one unit to the other, such pressure may be relieved.

With the parts in operative condition and the motor operating the drive shaft 17, it is obvious that if the control 54 is shifted to a point at which the element 36 is concentric with respect to the shaft 28, the pistons of this unit will not be reciprocating. Likewise, the valves 37, 38 will remain in engagement with their seats 56. Accordingly, the cylinder heads of the unit under consideration will not be connected with either the manifolds 39 or 40 or the passages extending therefrom. It follows that flow of fluid into and out of the cylinders and manifolds, which would occur due to compressibility of the liquid, is prevented by the fact that the valves remain closed. Furthermore, leakage past the piston of the left hand unit is thereby prevented. It will, of course, be understood that in installations where the loss incident to these factors would be of no great moment, the valve-operating eccentrics need not necessarily be adjustable. Under these circumstances, the complete control would be dependent upon the variation in eccentricity or throw of the piston-operating eccentrics.

Now, as the shaft 17 rotates, the differential assembly 19 will likewise be rotated. This will result in a rotation of the gears 23, 23a. It follows that shaft 27 will be rotated and this will cause the eccentric 46 to be revolved, thus causing reciprocation of the pistons of the right hand unit.

Likewise, the left hand gear 23 will rotate the gear 24 and accordingly the entire housing will be rotated. However, as afore brought out, such rotation will not cause any reciprocation of the pistons of the left hand unit with the parts adjusted to the position afore specified. Rotation of the eccentric 36 with reference to the slipper elements 35 will occur, however, because shaft 28 is fixed against rotation.

With no fluid capable of flowing through passages 47 and 48, it is, of course, obvious that the fluid within the cylinders of the right hand unit will be trapped, and the pistons of this right hand unit will not move within their cylinders, causing the housing 31 to rotate with the shaft 27. Under these circumstances, it is apparent that gears 24 and 25 will be forced to rotate together. Thus, the gears 23 and 23a, meshing with said gears, 24 and 25, respectively, will rotate together. Consequently, the drive pinions 21 and 21a will rotate at the same speed to accordingly drive the gears 22, shafts 15 and sprockets 16. Therefore, the vehicle will move in an absolutely straight path and no further manual attention of the operator will be necessary to secure a continuance of this effect. With the control 55' or equivalent unit being shifted towards one extreme position, the eccentricity of element 36 will be increased up to a maximum limit. Thus, if the lever 55' is moved to the "Left" position, it is apparent that liquid is caused to flow from the right hand unit to the left hand unit, so as to increase the speed of rotation of the housing 31 relative to shaft 27 and thus correspondingly increase the speed of rotation of gear 24 and the gear 23 meshing therewith. With the parts proportioned and designed in the manner shown, the speed of rotation of the gear 24 may be three times as great as that of the gear 25.

Conversely, with the control lever 55' moved to the "Right" position the rod 54 is actuated to shift the eccentric 36 through what might be termed neutral position and through to the opposite extreme of eccentricity, liquid will flow from the left hand unit, as viewed in Fig. 2, to the right hand unit, causing the shaft 27 to run faster than the casing or common member 31 and therefore gear 25 will run faster than gear 24. The volume of fluid displaced by the latter will increase as the degree of eccentricity increases. With the parts properly proportioned, the gear 25 may have its speed of rotation accelerated to a point where it is actually revolving at three times the rate of rotation of gear 24. Under these circumstances, the gear 23a, with which it meshes, will cause a correspondingly rapid drive of the corresponding drive pinion 21a to shift the tread coupled to the latter at three times the rate of speed of the tread which is connected to the opposite pinion 21.

Thus, either one of the treads may be caused to move in either direction at three times the rate of speed of the other tread. Of course, this ratio might be varied so that, for example, a two-to-one or 1.5 to 1 driving effect would occur between the different treads. As designed, and assuming that the shafts 20, 20a are rotating at 100 R. P. M. with the parts "locked" in neutral position, either the left hand or right hand tread may be caused to be driven by the corresponding pinions 21, 21a at 150 R. P. M. while the opposite pinion is rotating at 50 R. P. M.; this being under extreme conditions of adjustment of the control 55'. It is also to be remembered that according to the shifting of the eccentric 36, either the left or the right hand unit (as illustrated) may be caused to act as a pump while the second unit acts as a hydraulic motor. Thus, it is apparent that with the shafts 20, 20a operating at different speeds power is actually taken off of one shaft and transmitted through to the second shaft instead of simply being dissipated. In other words, while a braking effect does occur, it is transmitted in the form of power regenerated to the shaft which is not being braked.

Thus, it will be seen that the invention contemplates a combined driving and steering mechanism for motor vehicles of the type having traction devices at opposite sides thereof and in which steering is effected by changing the relative velocity of the traction devices, this being effected by a common drive means from the vehicle prime mover to each of said traction devices, including a differential mechanism and by means of hydraulic mechanism comprising two positive hydraulic displacement units connected together by high and low pressure passages, one of said hydraulic units being connected between a stationary abutment member, such as the frame of the vehicle, and a common structure which is connected for rotation proportional to one of the traction devices, the other hydraulic unit being connected between said common structure and means connected for rotation with the driving means for the other traction device, at least one of said hydraulic units being so constructed as to provide for varying flow from a maximum in one direction through zero to a maximum in the other direction. By such a mechanism, when the variable volume hydraulic unit is set for zero volume, the traction devices are forced to operate at the same velocity, causing the vehicle to move in a straight line and when said variable volume unit is set for passing liquid in one direction, one of said traction devices is constrained to move at a different velocity than the other traction device, causing the vehicle to travel in a circular path, the radius of which depends upon the volume for which said variable volume unit is set, and the side to which the vehicle is steered being dependent upon the direction of flow for which said unit is set.

Thus, among others, the several objects of the invention as specifically afore noted are achieved. Obviously, numerous changes in construction and rearrangement of the parts might be resorted to without departing from the spirit of the invention as defined by the claims.

I claim:

1. A control including in combination a rotatably mounted driving shaft, a pair of members to be rotated, means for operatively coupling said shaft to said members whereby in response to rotation of the former the latter will be driven, a transmitting unit including a pair of assemblies one functioning as a pump and the other as a motor, said transmitting unit being connected to said members, and means for controlling said assemblies to cause either one of them to function as a pump and absorb power from the member associated therewith; said pump driving the motor assembly to transmit power to the second of said members.

2. A control including in combination a rotatably mounted driving shaft, a pair of members to be rotated, means for operatively coupling said shaft to said members whereby in response to rotation of the former the latter will be driven, a transmitting unit including a pair of assemblies one functioning as a pump and the other as a motor, said transmitting unit being connected to said members, means for controlling said assemblies to cause either one of them to function as a pump and absorb power from the member associated therewith; said pump driving the motor assembly to transmit power to the second of said members and means for causing said assemblies to operate in a predetermined manner whereby said members will be caused to have a predetermined ratio of movement with respect to each other.

3. A control including in combination a rotatably mounted driving shaft, a pair of members to be rotated, means for operatively coupling said shaft to said members whereby in response to rotation of the former the latter will be driven, a transmitting unit including a pair of assemblies one functioning as a pump and the other as a motor, said transmitting unit being connected to said members, means for controlling said assemblies to cause either one of them to function as a pump and absorb power from the member associated therewith; said pump driving the motor assembly to transmit power to the second of said members and means for causing said transmitting unit to be rendered inoperative to transmit power from one member to the other member.

4. A control including in combination a rotatably mounted driving shaft, a pair of members to be rotated, means for operatively coupling said shaft to said members whereby in response to rotation of the former the latter will be driven, a transmitting unit including a pair of assemblies one functioning as a pump and the other as a motor, said transmitting unit being connected to said members, means for controlling said assemblies to cause either one of them to function as a pump and absorb power from the member associated therewith; said pump driving the motor assembly to transmit power to the second of said members and means for causing said transmitting unit to be rendered inoperative to transmit power from one member to the other member and to substantially "lock" said members against movement with respect to each other.

5. A control for a vehicle having a pair of driving members, said control including in combination a pair of elements connected to said members, means including a hydraulic pump and motor connected to said elements to retard either of the same, said hydraulic pump and motor means being so coupled to said elements that power may be transmitted by one of said elements to said pump means and be regenerated by said motor means to in turn transmit power to the second of said elements.

6. A control for a vehicle having a pair of driving members, said control including in combination a pair of elements connected to said members to control the latter, means including a hydraulic pump and motor connected to said elements to retard either of the same, said hydraulic pump and motor means being so coupled to said elements that power may be transmitted by one of said elements to said pump means and be regenerated by said motor means to in turn transmit power to the second of said elements, and manual means for controlling said pump and motor.

7. A control for a vehicle having a pair of driving members, said control including in combination a pair of elements connected to said members for regulating the latter, means including pressure generating means and fluid motor means so connected to said elements that either of the same may be retarded, said fluid pressure generating means being so connected with one of said members that it may be operated thereby and said motor means being so connected to the other member that it will assist in the operation of said other member.

8. A steering control for a vehicle drive including a pair of units each of which is adapted to optionally place fluid under pressure and to be driven by fluid pressure generated by the other unit, each of said units comprising a plurality of cylinders and valves for controlling the flow of fluid into and from said cylinders from and into passages interconnecting said units, a rotatable body housing both of said units, a rotatable shaft forming a part of one of said units, means for coupling said rotatable shaft to a driving element, means for coupling said rotatable body to a second driving element, and means for varying the displacement capacity of at least one of said units.

9. A steering control for a vehicle drive including a pair of units each of which is adapted to optionally place fluid under pressure and to be driven by fluid pressure generated by the other unit, each of said units comprising a plurality of cylinders and valves for controlling the flow of fluid into and from said cylinders from and into passages interconnecting said units, shafts forming a part of each of said units, a body containing both of said units rotatably mounted on said shafts, means for coupling one of said shafts to a driving element, means for coupling said rotatable body to a second driving element, means for varying the displacement capacity of at least one of said units, and means for varying the amount of movement of the valves of said unit in accordance with the displacement capacity of the unit.

10. A device for steering a motor vehicle by varying the relative speed of its driven members, comprising a main driving shaft for propelling said vehicle, a driven shaft for each driven member, differential gear mechanism intermediate said main driving shaft and said driven shafts, a hydraulic unit comprising two members, one of said members comprising a fluid pump rotatable about a fixed shaft and connected to one of the driven shafts, the other of said members being a fluid motor, the pistons of which are coupled to an eccentric on a rotating shaft connected to the other driven shaft, high and low pressure passages interconnecting said pump and motor, means for varying the capacity of said pump or neutralizing it and for reversing the flow of liquid between said pump and motor members, whereby, depending on the direction of flow between pump and motor, one of said driven shafts may be accelerated in relation to the other driven shaft.

11. Apparatus for driving and steering a motor vehicle in which steering is effected by varying the relative speed of its driven members, comprising a main driving shaft for propelling said vehicle, a driven shaft for each driven member, differential gear mechanism intermediate said main driving shaft and said driven shafts, a pair of hydraulic displacement devices, one of said devices being rotatable about a fixed shaft and operatively connected to one of the driven shafts, the other of said devices being operatively connected to the other driven shaft, high and low pressure passages interconnecting said devices, a variable eccentric for varying the capacity of one of said devices from zero to a maximum in either direction, whereby, depending on the direction of flow between said devices, one of said driven shafts may be accelerated in relation to the other driven shaft.

12. A drive including in combination a driving shaft, a pair of driven shafts, differential means operatively connecting the driving shaft to the two driven shafts, hydraulic drive means connected to said driven shafts in such a manner that the rotation of one of the same may be retarded, said hydraulic drive means comprising a fixed hydraulic unit coupled to one of the driven shafts and a variable hydraulic unit coupled to the other of said driven shafts, and means forming a part of said last-named means so constructed and arranged that the power made available incident to such retardation is transmitted to the other of said driven shafts.

13. A drive including in combination a driving shaft, a pair of members mechanically coupled to said shaft for rotation in response to rotation of said shaft and whereby the power transmitted by said shaft will be substantially equally divided between said members, hydraulic drive means connected to both of said members in such a manner that the rotation of either of the said members may be retarded, said hydraulic drive means comprising a fixed hydraulic displacement unit coupled to one of the driven shafts and a variable hydraulic displacement unit coupled to the other of said driven shafts, and means forming a part of said last-named means so constructed and arranged that the power made available incident to such retardation is transmitted to the other of said members.

14. Apparatus for driving and steering a motor vehicle in which steering is effected by varying the relative speed of its driven members, comprising a main driving shaft for propelling said vehicle, a driven shaft for each driven member, differential gear mechanism intermediate said main driving shaft and said driven shafts, rotary hydraulic displacement means comprising two units, one of which is operable as a pump when the other is operating as a motor, one of said units being rotatable about a fixed shaft and connected to one of the driven shafts, the other of said units being operatively connected to the other driven shaft, high and low pressure passages interconnecting said units, means for varying the capacity of one of said units from zero to a maximum and for reversing the flow of liquid between said units, whereby, depending on the direction of flow between said units, one of said driven shafts may be accelerated in relation to the other driven shaft.

15. In a motor vehicle of the type having traction devices at opposite sides thereof in which steering is effected by changing the relative velocity of the traction devices, the combination of drive means from the vehicle prime mover to each of said traction devices including a differential mechanism, and means for positively determining the relative velocity of said traction devices comprising two positive hydraulic displacement units, at least one of which is of the type providing for varying its displacement from a maximum in one direction through zero to a maximum in the other direction, and a structure common to said units including high and low pressure passages interconnecting said units and connected for transmitting forces to one of said traction devices, one of said units being connected for transmitting forces between the other traction device and said common structure, whereby when said variable volume hydraulic unit is set for zero volume the traction devices are forced to operate at the same velocity and when said variable volume unit is set for passing liquid in either direction, one of said traction devices is constrained to move at a velocity different from the other, causing the vehicle to travel in a curved path, the radius of said path depending upon the volume for which the variable volume unit is set, and the side to which the vehicle is steered being dependent upon the direction of flow for which said unit is set.

16. In a motor vehicle of the type having traction devices at opposite sides thereof in which steering is effected by changing the relative velocity of the traction devices, the combination of drive means from the vehicle prime mover to each of said traction devices including a differential mechanism, means for positively determining the relative velocity of said traction devices comprising two piston type positive hydraulic displacement units, at least one of which is of the type providing for varying its displacement from a maximum in one direction through zero to a maximum in the other direction, a structure common to said units, said structure having including cylinders for both of said units high and low pressure passages interconnecting said units and being adaptable for transmitting forces to one of said traction devices, pistons in one of said units being connected for transmitting forces between the other traction device and said common structure, and mechanism for varying the displacement of said variable displacement unit, whereby when said variable volume hydraulic unit is set for zero volume the traction devices are forced to operate at the same velocity and when said variable volume unit is set for passing liquid in either direction, one of said traction devices is constrained to move at a different velocity causing the vehicle to travel in a curved path, the radius of said path depending upon the volume for which the variable volume unit is set and the side to which the vehicle is steered being dependent upon the direction of flow for which said unit is set.

17. In a motor vehicle of the type having traction devices at opposite sides thereof in which steering is effected by changing the relative velocity of the traction devices, the combination of drive means from the vehicle prime mover to each of said traction devices including a differential mechanism, means for positively determining the relative velocity of said traction devices comprising two positive hydraulic displacement units, each of said units comprising a plurality of cylinders, a plurality of pistons, and an eccentric operating said pistons, the eccentric of at least one of said units being adjustable for varying the displacement of said unit from a maximum in one direction through zero to a maximum in the other direction, a structure common to said units including the cylinders of both said units, said structure having high and low pressure passages interconnecting said units and being adaptable for transmitting forces to one of said traction devices, the pistons of one of said units being connected to the other traction device and the pistons of the other unit being connected to the frame of the vehicle, and external means for adjusting said adjustable eccentric whereby when said eccentric is adjusted for zero volume the traction devices are forced to operate at the same velocity and when said eccentric is adjusted for passing liquid in either direction, one of said traction devices is constrained to move at a different velocity, causing the vehicle to travel in a curved path, the radius of said path depending upon the adjustment of said eccentric and the side to which the vehicle is steered being dependent upon the direction of flow for which said eccentric is set.

18. In a drive for a vehicle of the type having a driving motor and traction devices at opposite sides thereof in which steering is effected by changing the relative velocity of the traction devices, the combination of drive means adapted to be driven by the motor of the vehicle, said means comprising driving connections including a differential mechanism adapted to drive each of said traction devices, means for positively determining the relative velocity of said traction device driving connections comprising two positive hydraulic displacement units, at least one of which is of the type providing for varying its displacement from a maximum in one direction through zero to a maximum in the other direction, and a structure common to said units including high and low pressure passages interconnecting said units, said structure being adapted for transmitting forces to one of said traction device driving connections, and one of said units being connected for transmitting forces between the other traction device driving connections and said common structure.

19. In a drive for a vehicle of the type having a driving motor and traction devices at opposite sides thereof in which steering is effected by changing the relative velocity of the traction devices, the combination of common drive means adapted to be driven by the motor of the vehicle, said means comprising driving connections including a differential mechanism adapted to drive each of said traction devices, means for positively determining the relative velocity of said traction device driving connections comprising two piston type positive hydraulic displacement units, at least one of which is of the type providing for varying its displacement from a maximum in one direction through zero to a maximum in the other direction, a structure common to said units including cylinders for both of said units and high and low pressure passages interconnecting said units, said structure being adapted for transmitting forces to one of said traction device driving connections, pistons in one of said units for transmitting forces between the other traction device driving connections and said common structure, pistons in the other unit coupled to the frame of the vehicle, and mechanism for adjusting the means for varying the displacement of said variable displacement unit.

20. In a drive for a vehicle of the type having a driving motor and traction devices at opposite sides thereof in which steering is effected by changing the relative velocity of the traction devices, the combination of common drive means adapted to be driven by the motor of the vehicle, said means comprising driving connections including a differential mechanism adapted to drive each of said traction devices, means for positively determining the relative velocity of said traction device driving connections comprising two positive hydraulic displacement units, each of said units comprising a plurality of cylinders, a plurality of pistons and an eccentric operating said pistons, the eccentric of at least one of said units being adjustable for providing for varying the displacement of said unit from a maximum in one direction through zero to a maximum in the other direction, a structure common to said units including the cylinders of both said units and high and low pressure passages interconnecting said units, said structure being adapted for transmitting forces to one of said traction device driving connections, the pistons of one of said units being connected to the other traction device driving connection and the pistons of the other unit being coupled to the frame of the vehicle, and external means for adjusting said eccentric.

21. In a drive for a vehicle of the type having a driving motor and traction devices at opposite sides thereof in which steering is effected by changing the relative velocity of the traction devices, the combination of common drive means adapted to be driven by the motor of the vehicle, said means comprising driving connections including a differential mechanism adapted to drive each of said traction devices, means for positively determining the relative velocity of said traction device driving connections comprising two positive hydraulic displacement units, one of which is of the type providing for varying its displacement from a maximum in one direction through zero to a maximum in the other direction, and a structure common to said units including high and low pressure passages interconnecting said units and connected for transmitting forces to one of said traction device driving connections, one of said units being connected for transmitting forces between the other traction device driving connections and said common structure and the variable displacement unit being coupled between said common structure and the frame of the vehicle.

22. In a drive for a vehicle of the type having a driving motor and traction devices at opposite sides thereof in which steering is effected by changing the relative velocity of the traction devices, the combination of common drive means adapted to be driven by the motor of the vehicle, said means comprising driving connections including a differential mechanism adapted to drive each of said traction devices, means for positively determining the relative velocity of said traction driving connections comprising two piston type positive hydraulic displacement units, one of which is of the type providing for varying its displacement from a maximum in one direction through zero to a maximum in the other direction, a structure common to said units including cylinders and high and low pressure passages interconnecting said units and connected for transmitting forces to one of said traction device driving connections, pistons in one of said units for transmitting forces between the other traction device driving connections and said common structure, pistons in the variable volume unit, a stationary shaft connected to said variable volume pistons, and means for adjusting the means for varying the displacement of said variable displacement unit.

23. In a motor vehicle of the type having a frame and traction devices at opposite sides thereof in which steering is effected by changing the relative velocity of the traction devices, the combination of common drive means from the vehicle prime mover to each of said traction devices including a differential mechanism, means for positively determining the relative velocity of said traction devices comprising a variable speed hydraulic displacement power transmission so connected for transmitting forces between the frame and each of said traction devices that one of said traction devices may be constrained to move at a different velocity than the other traction device, causing the vehicle to travel in a curved path, and that the sum of the motions applied to the two traction devices remains substantially constant, said power transmission comprising a fixed-stroke hydraulic unit coupled to one of said traction devices and a variable-stroke hydraulic unit coupled to the other of said traction devices.

24. A control for a vehicle of the type having traction devices at opposite sides thereof in which steering is effected by varying the relative velocity of said devices comprising, in combination, means for driving said traction devices, and a hydraulic transmission unit coupled to said means for selectively varying the velocity of said devices, said transmission unit comprising a variable hydraulic unit and a fixed hydraulic unit interconnected by a pair of fluid passages, said variable hydraulic unit being coupled to one of said traction devices and being adapted for preventing fluid flow through said passages between said units when said vehicle is being directed along a straightaway course.

25. A control for a vehicle of the type having traction devices at opposite sides thereof in which steering is effected by varying the relative velocity of said devices comprising, in combination, means for driving said traction devices, a hydraulic transmission unit coupled to said means and adapted to selectively vary the velocity of said devices, said unit comprising a variable hydraulic unit responsive to manual control for steering said vehicle, a fixed hydraulic unit connected with said variable unit by a pair of fluid passages, and a common structure housing said variable and fixed units and said passages, said variable hydraulic unit being adapted for preventing fluid flow through said passages and thereby locking said traction devices in parallel when said vehicle is being directed along a straightaway course.

26. A control for a vehicle of the type having traction devices at opposite sides thereof in which steering is effected by varying the relative velocity of said devices comprising, in combination, driving means for said traction devices, a hydraulic transmission unit bridged across said traction devices and also driven by said driving means, said transmission unit comprising a variable hydraulic unit responsive to manual control, a fixed hydraulic unit connected with said variable unit by a pair of fluid passages, and a common revolvable structure housing said fixed and variable units and said fluid passages, said variable unit being adapted for preventing liquid flow through said passages when said vehicle is to be driven along a straightaway course, whereby both of said traction devices are held to a constant velocity.

27. A control for a vehicle of the type having traction devices at opposite sides thereof in which steering is effected by varying the relative velocity of said devices comprising, in combination, driving means for said traction devices, a hydraulic transmission unit bridged across said traction devices and also driven by said driving means, said transmission unit comprising a variable hydraulic unit responsive to manual control, a fixed hydraulic unit connected with said variable unit by a pair of fluid passages, said fixed unit being coupled to one of said traction devices, and a common revolvable structure housing said fixed and variable units and said fluid passages, said revolvable structure being coupled to the other of said traction devices, said variable unit being adapted for preventing liquid flow through said passages when said vehicle is to be driven along a straightaway course, whereby both of said traction devices are held to a constant velocity.

28. A control for steering a motor vehicle comprising, in combination, driving means for propelling said vehicle, a pair of members driven by said means, and a hydraulic transmission unit coupled across said members for controlling the relative speed of said members, said transmission unit comprising a variable-stroke hydraulic unit and a fixed-stroke hydraulic unit interconnected by a pair of passages for flow of liquid therethrough, a stationary shaft for supporting said variable hydraulic unit, a rotatable shaft for supporting said fixed hydraulic unit, said rotatable shaft being coupled to one of said driven members, and a common structure adaptable for rotary movement around said stationary and fixed unit shafts, said structure being coupled to the other of said driven members, whereby in accordance with the relative movement of said rotatable structure and said rotary shaft the speed of said driven members and in turn the direction of said vehicle is controlled.

29. A control for steering a motor vehicle comprising, in combination, driving means for propelling said vehicle, a pair of treads driven by said means, and a hydraulic transmission unit bridged across said treads for controlling the relative speed of said treads, said transmission unit comprising a variable hydraulic unit and a fixed hydraulic unit interconnected by a plurality of passages, a common rotatable structure housing said variable and fixed units, and means associated with said variable hydraulic unit for preventing liquid flow through said passages and for locking said variable and fixed units together, whereby said treads are locked together to steer the vehicle on a straightaway course.

ELIAS ORSHANSKY, Jr.